(12) United States Patent
Neumann

(10) Patent No.: US 12,153,938 B2
(45) Date of Patent: *Nov. 26, 2024

(54) SYSTEMS AND METHODS FOR A CONFIGURABLE DEVICE ENVIRONMENT

(71) Applicant: KPN INNOVATIONS, LLC., Lakewood, CO (US)

(72) Inventor: Kenneth Neumann, Lakewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/113,878

(22) Filed: Feb. 24, 2023

(65) Prior Publication Data
US 2023/0229459 A1    Jul. 20, 2023

Related U.S. Application Data

(63) Continuation-in-part of application No. 17/087,713, filed on Nov. 3, 2020, now Pat. No. 11,599,614.

(51) Int. Cl.
*G06F 9/445* (2018.01)
*G06F 3/01* (2006.01)
(Continued)

(52) U.S. Cl.
CPC ............ *G06F 9/4451* (2013.01); *G06F 3/015* (2013.01); *G06F 21/32* (2013.01); *G06N 20/00* (2019.01);
(Continued)

(58) Field of Classification Search
None
See application file for complete search history.

(56) References Cited

U.S. PATENT DOCUMENTS 8,526,012 B1 * 9/2013 Schuster .............. G01B 11/245
356/612
9,042,971 B2 * 5/2015 Brumback .............. H04L 67/12
600/595
(Continued)

FOREIGN PATENT DOCUMENTS

WO    WO-2017192888 A1 * 11/2017 ........... A61B 5/0064

OTHER PUBLICATIONS https://www.apple.com/shop/product/MUFM2LL/A/beddit-sleep-monitor; Beddit Sleep Monitor.
(Continued)

*Primary Examiner* — Lashonda Jacobs-Burton
(74) *Attorney, Agent, or Firm* — Caldwell Intellectual Property Law

(57) ABSTRACT

A system for a configurable device environment, the system comprising a computing device configured to receive remote data corresponding to a subject and a plurality of signals from at least a sensor proximate to the subject, retrieve a biometric profile of the subject, identify a pattern of accessory device states for a plurality of accessory devices, wherein identifying includes determining a coordinated state change for a group of accessory devices of the plurality of accessory devices as a function of the remote data and the biometric profile and identifying the pattern of accessory device states as a function of the coordinated state change, determine an automation rule for the group of accessory devices as a function of the pattern of accessory device states, and transmit, to the group of accessory devices, the automation rule.

20 Claims, 7 Drawing Sheets

(51) Int. Cl.
*G06F 21/32* (2013.01)
*G06N 20/00* (2019.01)
*H04L 41/16* (2022.01)
*H04L 43/02* (2022.01)
*H04L 67/50* (2022.01)

(52) U.S. Cl.
CPC .............. *H04L 41/16* (2013.01); *H04L 43/02* (2013.01); *H04L 67/535* (2022.05)

(56) References Cited

U.S. PATENT DOCUMENTS

| | | | |
|---|---|---|---|
| 9,072,437 B2 | 7/2015 | Paalasmaa | |
| 9,818,245 B2 * | 11/2017 | Chuang | G07C 9/00896 |
| 10,250,597 B2 * | 4/2019 | Hoyos | G06F 16/9535 |
| 10,380,499 B2 * | 8/2019 | Ylipaavalniemi | G06F 18/2415 |
| 10,568,570 B1 * | 2/2020 | Sherpa | G06N 5/02 |
| 10,810,450 B2 * | 10/2020 | Ashdown | G06F 16/29 |
| 10,824,852 B1 * | 11/2020 | Zhang | G06V 10/82 |
| 10,869,620 B2 * | 12/2020 | Longinotti-Buitoni | A61B 5/6805 |
| 11,157,832 B2 * | 10/2021 | Kundu | G06F 21/32 |
| 11,232,370 B2 * | 1/2022 | Liu | G16H 50/20 |
| 2015/0173671 A1 | 6/2015 | Paalasmaa et al. | |
| 2017/0345089 A1 * | 11/2017 | Wu | G06T 19/00 |
| 2018/0249930 A1 * | 9/2018 | Baskerville | A61B 5/352 |
| 2019/0298526 A1 * | 10/2019 | Chanin | B29C 64/393 |
| 2020/0188732 A1 * | 6/2020 | Kruger | G06F 3/0346 |
| 2020/0301499 A1 | 9/2020 | Marti et al. | |
| 2020/0342086 A1 * | 10/2020 | Oung | H04W 12/065 |
| 2020/0390587 A1 * | 12/2020 | Svanegaard | A61F 5/4404 |
| 2020/0395120 A1 * | 12/2020 | Svanegaard | A61B 5/4255 |
| 2022/0029986 A1 * | 1/2022 | Neumann | G16H 80/00 |
| 2022/0135897 A1 * | 5/2022 | Shishikura | F16H 57/0464 508/331 |
| 2022/0138293 A1 * | 5/2022 | Herrema, III | G06F 21/32 726/7 |

OTHER PUBLICATIONS https://www.apple.com/shop/product/HML02ZM/A/la-roche-posay-my-skin-track-uv-sensor; La Roche-Posay My Skin Track UV Sensor.

https://www.apple.com/shop/product/HMV82VC/A/wynd-plus-smart-personal-air-purifier; Wynd Plus Smart Personal Air Purifier.

* cited by examiner

SYSTEMS AND METHODS FOR A CONFIGURABLE DEVICE ENVIRONMENT

CROSS-REFERENCE TO RELATED APPLICATIONS

This application is a continuation-in-part of U.S. Nonprovisional application Ser. No. 17/087,713 filed on Nov. 3, 2020, now U.S. Pat. No. 11,599,614 B2 issued on Mar. 7, 2023, and entitled "SYSTEMS AND METHODS FOR A CONFIGURABLE DEVICE ENVIRONMENT," the entirety of which is incorporated herein by reference.

FIELD OF THE INVENTION

The present invention generally relates to the field of electronic device configuration. In particular, the present invention is directed to systems and methods for a configurable device environment.

BACKGROUND

Electronic devices are becoming increasingly popular in a range of applications. Device management for configuring an environment in the absence of user feedback is difficult to maintain, especially for a range of electronically controllable devices such as thermostats, lighting devices, household appliances, etc., that typically operate without direct communication.

SUMMARY OF THE DISCLOSURE

In an aspect, a system for a configurable device environment, the system including a computing device configured to receive remote data corresponding to a subject, wherein receiving further includes receiving interaction data from a plurality of accessory devices; and receiving a plurality of signals from at least a sensor proximate to the subject, wherein a signal of the plurality of signals includes skin data; retrieve a biometric profile of the subject as a function of the plurality of signals; identify a pattern of accessory device states for the plurality of accessory devices, wherein identifying the pattern further includes determining, by the computing device, a coordinated state change for a group of accessory devices of the plurality of accessory devices as a function of the interaction data and the biometric profile; and identifying the pattern of accessory device states as a function of the coordinated state change; and control the function of the plurality of accessory devices as a function of the pattern of accessory device states.

In another aspect, a method for a configurable device environment, the method comprising a computing device configured for receiving, by at least a computing device, remote data corresponding to a subject, wherein receiving further includes receiving interaction data from a plurality of accessory devices; and receiving a plurality of signals from at least a sensor proximate to the subject, wherein a signal of the plurality of signals includes skin data; retrieving, by the at least computing device, a biometric profile of the subject as a function of the plurality of signals; identifying, by the at least computing device, a pattern of accessory device states for the plurality of accessory devices, wherein identifying the pattern further includes determining, by the computing device, a coordinated state change for a group of accessory devices of the plurality of accessory devices as a function of the interaction data and the biometric profile; and identifying the pattern of accessory device states as a function of the coordinated state change; and controlling, by the at least computing device, the function of the plurality of accessory devices as a function of the pattern of accessory device states.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a configurable device environment. In an embodiment, the system includes a computing device configured to receive remote data from a plurality of accessory devices that corresponds to how the devices interact with a subject, and may include a plurality of signals from sensors gathering data about the subject. The computing device is configured to receive a biometric profile of the subject. Computing device may be configured to generate the biometric profile of the subject by training machine-learning models with data correspond to signals transmitted from devices as a function of the interaction of the device with the subject. The system may use the biometric profile to identify a change in the accessory device states for the plurality of accessory devices to guide the accessory devices to produce an optimum environment for the subject. The system may transmit an automation rule to the accessory device to automatedly alter the states of the accessory devices to achieve and maintain an optimum environment for the subject.

Figure 1:
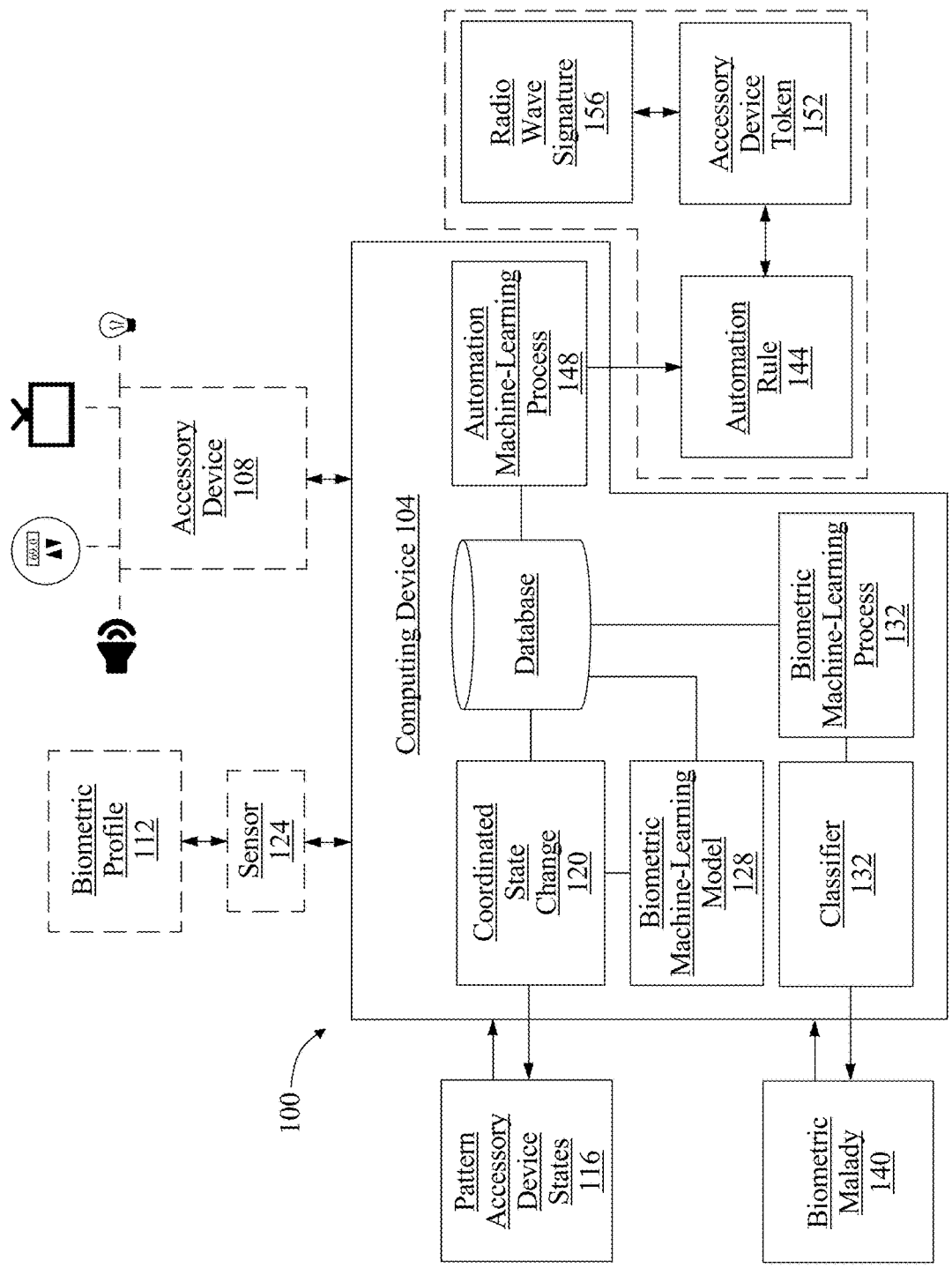
FIG. 1 is a block diagram illustrating a system for a configurable device environment.

Referring now to FIG. 1, an exemplary embodiment of a system 100 for a configurable device environment is illustrated. System 100 includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

Continuing in reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing in reference to FIG. 1, computing device 104 is configured to receive remote data corresponding to a subject. As used in this disclosure, "remote data," is data received from a remote device such as an accessory device and/or a sensor as described in this disclosure; remote data may include interaction data and/or any data corresponding to a subject's interaction with an accessory device. An "accessory device," as used in this disclosure, is any device or thing located in an environment that is controllable (at least to some degree) by a controller. An accessory device 108 may include devices that are able to have an effect on the subject's environment. An accessory device 108 may include a computing device such as a "smartphone", television, laptop, tablet computer, internet-of-things (IOT) device, and the like. An accessory device 108 may include household appliances, windows, garage door system, vehicle lock, light fixture, security camera, sprinkler system, home entertainment systems, thermostat, humidifier, air purifier, ambient sound generator, television, stereo, and the like, that may have an effect on the subject's environment. An accessory device 108 may have an effect on the subject's environment by altering and/or controlling the humidity, temperature, sound level, lighting, pollutants, allergens, atmosphere, access, control, and the like.

Continuing in reference to FIG. 1, as used in this disclosure, "interaction data" from a plurality of accessory devices is data relating to the activation state and function of the plurality of accessory devices 108 and how a subject has changed and/or selected the activate state and function of the plurality of accessory devices 108. As used in this disclosure, an "activation state," is a state of activation of a device, such as its power status ('on' and/or 'off'), its mode of activation ('high', 'medium', 'low', etc.), and the like. For instance and without limitation, the activation state of a thermostat may be 'cool', 'on', and '69 degrees Fahrenheit', wherein the activation state includes the current status (on) magnitude (69 degrees Fahrenheit) and direction (cool) of the thermostat's current functioning. As used in this disclosure, the "function of the plurality of accessory devices," is the purpose, action, or effect of the plurality of accessory devices. For instance and without limitation, the function of a thermostat may include 'the ability to maintain a desirable temperature of an area', 'cooling', and/or 'heating'. The function 'as it relates to the presence of the subject', for instance and without limitation, may refer to an accessory device 108 such as a thermostat in a particular activation state, such as initiating a cooling function, due to the subject's willingness to control the device by interacting with the device to control the activation state. In non-limiting illustrative examples, 'the activation state and function of the plurality of accessory devices as it relates to the presence of the subject' may be data received by computing device 104 that relates to whether a subject is comfortable, tired, restless, hot, cold, hungry, or the like, according to how the subject interacts with an accessory device 108 and/or how the computing device has received data about the subject, for instance as retrieving a biometric profile, receiving wearable device data, and the like, as described in further detail below.

Continuing in reference to FIG. 1, computing device 104 is configured for receiving a plurality of signals from at least a sensor proximate to the subject. Each sensor of a plurality of sensors may be configured to detect within the proximity of the subject, wherein 'proximity' may refer to being in contact with a subject's skin, body, ingested, injected, and/or placed inside a subject, in the same room as a subject, directed towards a subject, or configured in any way to collect signals from subject. Each sensor 124 may generate a plurality of signals corresponding to the type of data the sensor 124 is configured to collect; the plurality of signals may be stored and/or retrieved from a database, as described in further detail below. At least a sensor 124 may include a wearable device such as such as an accelerometer, pedometer, gyroscope, electrocardiography (ECG) device, electrooculography (EOG) device, bioimpedance monitor, blood pressure and heart rate monitor, respiration monitor, force sensor, oxygenation monitor, biosensors, UV sensor, thermal sensor, fitness trackers, force monitors, motion sensors, audio-visual capture data, social media platform data, and the like. At least a sensor 124 may include wearables that are capable of transmitting a signal pertaining to a subject during, for instance and without limitation, fitness activity using a variety of methods, for instance with without limitation, by utilizing wearable adhesive sensors that attach to the skin, silver/silver chloride traces in compression garments, textile band electrodes, and the like, as a wearable sensor. At least a sensor 124 may contain flexible and/or disposable-type sensors that are applied in a manner similar to how medical devices for monitoring athletes in sports physiology studies, diabetes monitoring, heart monitoring by electrocardiogram (ECG/EKG), and the like.

Continuing in reference to FIG. 1, a signal from at least a sensor 124 may include signals from a wearable fitness device. As used in this disclosure, "signal" is a signal containing data indicative of a subject's physiological state; physiological state may be evaluated by the computing device 104 with regard to one or more measures of health of a subject's body, one or more systems within a subject's body such as a circulatory system, a digestive system, a nervous system, or the like, one or more organs within a subject's body, and/or any other subdivision of a subject's body useful for diagnostic or prognostic purposes. At least a sensor 124 signal may include unique biometric data such as retina scan data, fingerprint data, voice recognition data, facial recognition data, and the like. For instance, and without limitation, biometric profile 112 may include sensor 124 data directed to a particular set of biomarkers, test results, and/or biochemical information which may be recognized in a given medical field as useful for identifying various disease conditions or prognoses within a relevant field. As a non-limiting example, and without limitation, sensor 124 data describing red blood cells, such as red blood cell count, hemoglobin levels, hematocrit, mean corpuscular volume, mean corpuscular hemoglobin, electrolytes, AST and ALT content, blood glucose, CK levels, and/or mean corpuscular hemoglobin concentration may be recognized as useful for identifying various conditions such as dehydration, high and/or low testosterone, nutrient deficiencies, kidney dysfunction, chronic inflammation, anemia, overtraining, blood loss, and/or acute injury.

With continued reference to FIG. 1, sensor 124 signal data may include, without limitation, hematological data, such as red blood cell count, which may include a total number of red blood cells in a person's blood and/or in a blood sample, hemoglobin levels, hematocrit representing a percentage of blood in a person and/or sample that is composed of red blood cells, mean corpuscular volume, which may be an estimate of the average red blood cell size, mean corpuscular hemoglobin, which may measure average weight of hemoglobin per red blood cell, mean corpuscular hemoglobin concentration, which may measure an average concentration of hemoglobin in red blood cells, platelet count, mean platelet volume which may measure the average size of platelets, red blood cell distribution width, which measures variation in red blood cell size, absolute neutrophils, which measures the number of neutrophil white blood cells, absolute quantities of lymphocytes such as B-cells, T-cells, Natural Killer Cells, and the like, absolute numbers of monocytes including macrophage precursors, absolute numbers of eosinophils, and/or absolute counts of basophils. Sensor signal data may include, without limitation, immune function data such as Interleukine-6 (IL-6), TNF-alpha, systemic inflammatory cytokines, and the like.

Continuing to refer to FIG. 1, sensor 124 signal data may include, without limitation, data describing blood-born lipids, including total cholesterol levels, high-density lipoprotein (HDL) cholesterol levels, low-density lipoprotein (LDL) cholesterol levels, very low-density lipoprotein (VLDL) cholesterol levels, levels of triglycerides, and/or any other quantity of any blood-born lipid or lipid-containing substance. Sensor signal data may include measures of glucose metabolism such as fasting glucose levels and/or hemoglobin A1-C (HbA1c) levels. Sensor 124 signal data may include, without limitation, one or more measures associated with endocrine function, such as without limitation, quantities of dehydroepiandrosterone (DHEAS), DHEA-Sulfate, quantities of cortisol, ratio of DHEAS to cortisol, quantities of testosterone quantities of estrogen, quantities of growth hormone (GH), insulin-like growth factor 1 (IGF-1), quantities of adipokines such as adiponectin, leptin, and/or ghrelin, quantities of somatostatin, progesterone, or the like. Sensor 124 signal data may include measures of estimated glomerular filtration rate (eGFR). Sensor 124 signal data may include quantities of C-reactive protein, estradiol, ferritin, folate, homocysteine, prostate-specific Ag, thyroid-stimulating hormone, vitamin D, 25 hydroxy, blood urea nitrogen, creatinine, sodium, potassium, chloride, carbon dioxide, uric acid, albumin, globulin, calcium, phosphorus, alkaline phosphatase, alanine amino transferase, aspartate amino transferase, lactate dehydrogenase (LDH), bilirubin, gamma-glutamyl transferase (GGT), iron, and/or total iron binding capacity (TIBC), or the like. Sensor 124 signal data may include antibody levels. Sensor 124 signal data may include data concerning heavy metal and/or toxin levels such as for lead, cadmium, and arsenic. Sensor 124 signal data may include levels of fibrinogen, plasma cystatin C, and/or brain natriuretic peptide. Biometric profile 112 of a subject may include the above data and may include determinations about disorders from the above signals, for instance and without limitation immunological disorders such as Hashimoto's Thyroiditis, Graves' Disease, diabetes, or the like, which may indicate a subject prefers a particular environment such as a particular temperature.

Continuing to refer to FIG. 1, sensor 124 signal data may include measures of lung function such as forced expiratory volume, one second (FEV-1) which measures how much air can be exhaled in one second following a deep inhalation, forced vital capacity (FVC), which measures the volume of air that may be contained in the lungs. Sensor 124 signal data may include a measurement blood pressure, including without limitation systolic and diastolic blood pressure. Sensor 124 signal data may include a measure of waist circumference. Sensor 124 signal data may include body mass index (BMI). Sensor 124 signal data may include one or more measures of bone mass and/or density such as dual-energy x-ray absorptiometry. Sensor 124 signal data may include one or more measures of muscle mass. Sensor 124 signal data may include one or more measures of physical capability such as without limitation measures of grip strength, evaluations of standing balance, evaluations of gait speed, pegboard tests, timed up and go tests, and/or chair rising tests.

Still viewing FIG. 1, sensor 124 signal data may include one or more measures of cognitive function, including without limitation Rey auditory verbal learning test results, California verbal learning test results, NIH toolbox picture sequence memory test, Digital symbol coding evaluations, and/or Verbal fluency evaluations. Sensor signal data may include one or more evaluations of sensory ability, including measures of audition, vision, olfaction, gustation, vestibular function, and pain. Sensor 124 signal data may correspond to the level of pain and/or discomfort a subject may be experiencing.

Continuing to refer to FIG. 1, sensor 124 signal data may include psychological data. Psychological data may include any data generated using psychological, neuro-psychological, and/or cognitive evaluations, as well as diagnostic screening tests, personality tests, personal compatibility tests, or the like; such data may include, without limitation, numerical score data entered by an evaluating professional and/or by a subject performing a self-test such as a computerized questionnaire. Psychological data may include textual, video, or image data describing testing, analysis, and/or conclusions entered by a medical professional such as without limitation a psychologist, psychiatrist, psychotherapist, social worker, a medical doctor, or the like. Psychological data may include data gathered from subject interactions with persons, documents, and/or computing devices; for instance, subject patterns of purchases, including electronic purchases, communication such as via chat-rooms or the like, any textual, image, video, and/or data produced by the subject, any textual image, video and/or other data depicting and/or describing the subject, or the like. Any psychological data and/or data used to generate psychological data may be analyzed using machine-learning and/or language processing modules as described in this disclosure.

Still referring to FIG. 1, sensor 124 signal data may include genomic data, including deoxyribonucleic acid (DNA) samples and/or sequences, such as without limitation DNA sequences contained in one or more chromosomes in human cells. Genomic data may include, without limitation, ribonucleic acid (RNA) samples and/or sequences, such as samples and/or sequences of messenger RNA (mRNA) or the like taken from human cells. Genetic data may include telomere lengths. Genomic data may include epigenetic data including data describing one or more states of methylation of genetic material. Sensor 124 signal data may include proteomic data, which as used herein, may include data describing all proteins synthesized and/or modified by subject, including any microbiome organism, colony of organisms, or system of organisms, and/or a subset thereof. Sensor 124 signal data may include data concerning a microbiome of a subject, which as used herein, may include any data describing any microorganism and/or combination of microorganisms living on or within a person, including without limitation biomarkers, genomic data, proteomic data, and/or any other metabolic or biochemical data useful for analysis of the effect of such microorganisms on other sensor signal data of a person, and/or on prognostic labels and/or ameliorative processes as described in further detail below.

Still referring to FIG. 1, sensor 124 signal data may include skin data received from a skin analyzing device. "Skin data," as used herein, is analytics of a user's skin. For example, skin data may include analytics regarding the epidermis, dermis, and the hypodermis layers of skin. Skin data may include data regarding oil and sweat glands, nerves, hair follicles, and other structures related to the skin. Skin data may include analytics regarding the complexion of pores, spots, pigmentation, moisture, fine lines, wrinkles, melanin, tone, keratin, redness, pH level, texture, porphyrins, and UV spots. A skin analyzing device may include a camera or camera-based computing system utilizing RGB visible light, PL polarized light, UV spectrum imaging technology, and the like to analyze a user's skin.

Still referring to FIG. 1, in some embodiments, sensor 124 signal data may include a discovery center experience. A "discovery center experience" as used in this disclosure is defined as a set of simulated data generated at an online platform, known as a discovery center, which describes various potential health experiences to optimize user's health. "Simulated data" as used in this disclosure is defined as taking a large amount of data and using it to mimic real-world scenarios of conditions. For example, a discovery center experience may include a future user experience wherein a comprehensive body scan may be performed, and user may be portrayed in a 3-dimensional version and have an experience to simulate what happens if user chooses optimal nourishment. User may also see what their future self may look like 3, 6, 9 or 12 months into the future and the like. A user display may show what living optimally looks like as well as what user could look like with no change and alternatively, what user could look like without proper nourishment. A discovery center experience may also include one or a number of biological extractions from the user. These biological extractions might include physical experiences, diagnostic testing, sleep patterns, fitness patterns, current nutrient levels or any other form of information coming from the user that is then utilized to determine their optimal nourishment needs. Nourishment needs may include a complete state of physical, mental, nutritional, and spiritual wellbeing. A discovery center experience may include embodiments as disclosed in U.S. Non-provisional application Ser. No. 17/387,245 filed on Jul. 38, 2021 and entitled "METHODS AND SYSTEMS FOR PROVIDING ALIMENTARY ELEMENTS," the entirety of which is incorporated herein by reference. With continued reference to FIG. 1, sensor 124 signal data may include one or more subject-entered descriptions of a person's physiological state, wherein the sensor 124 is a user device such as a "smartphone", mobile device, or the like, that is configured to accept input from subject. One or more subject-entered descriptions may include, without limitation, subject descriptions of symptoms, which may include without limitation current or past physical, psychological, perceptual, and/or neurological symptoms, subject descriptions of current or past physical, emotional, and/or psychological problems and/or concerns, subject descriptions of past or current treatments, including therapies, nutritional regimens, exercise regimens, pharmaceuticals or the like, or any other subject-entered data that a subject may provide to a medical professional when seeking treatment and/or evaluation, and/or in response to medical intake papers, questionnaires, questions from medical professionals, or the like. Sensor 124 signal data may include any sensor signal data, as described above, describing any multicellular organism living in or on a person including any parasitic and/or symbiotic organisms living in or on the persons; non-limiting examples may include mites, nematodes, flatworms, or the like. Examples of sensor signal data described in this disclosure are presented for illustrative purposes only and are not meant to be exhaustive.

With continued reference to FIG. 1, sensor 124 signal may include physiological data captured as the result of a medical test, physiological assessment, cognitive assessment, psychological assessment, or the like, wherein the sensor 124 may include a computing device 104, user device, or other device used to collect signals pertaining to the test and/or assay. System 100 may receive at least a sensor 124 signal from one or more other devices after performance; system 100 may alternatively or additionally perform one or more assessments and/or tests to obtain at least a sensor 124 signal, and/or one or more portions thereof, on system 100. For instance, sensor 124 signal may include or more entries by a subject in a form or similar graphical subject interface object; one or more entries may include, without limitation, subject responses to questions on a psychological, behavioral, personality, or cognitive test. For instance, at least a computing device 104 may present to subject a set of assessment questions designed or intended to evaluate a current state of mind of the subject, a current psychological state of the subject, a personality trait of the subject, or the like; at least a computing device 104 may provide subject-entered responses to such questions directly as at least a physiological data and/or may perform one or more calculations or other algorithms to derive a score or other result of an assessment as specified by one or more testing protocols, such as automated calculation of a Stanford-Binet and/or Wechsler scale for IQ testing, a personality test scoring such as a Myers-Briggs test protocol, or other assessments that may occur to persons skilled in the art upon reviewing the entirety of this disclosure.

With continued reference to FIG. 1, assessment and/or self-assessment data, and/or automated or other assessment results, obtained from a third-party device; third-party device may include, without limitation, a server or other device (not shown) that performs automated cognitive, psychological, behavioral, personality, or other assessments. Third-party device may include a device operated by an informed advisor. An informed advisor may include any medical professional who may assist and/or participate in the medical treatment of a subject. An informed advisor may include a medical doctor, nurse, physician assistant, pharmacist, yoga instructor, nutritionist, spiritual healer, meditation teacher, fitness coach, health coach, life coach, and the like.

With continued reference to FIG. 1, sensor 124 data may include data describing one or more test results, including results of mobility tests, stress tests, dexterity tests, endocrinal tests, genetic tests, and/or electromyographic tests, biopsies, radiological tests, genetic tests, and/or sensory tests. Persons skilled in the art, upon reviewing the entirety of this disclosure, will be aware of various additional examples of at least a physiological sample consistent with this disclosure.

With continued reference to FIG. 1, sensor 124 data may be obtained from a wearable sensor. At least a sensor 124 may include any medical sensor 124 and/or medical device configured to capture sensor 124 data concerning a subject, including any scanning, radiological and/or imaging device such as without limitation x-ray equipment, computer assisted tomography (CAT) scan equipment, positron emission tomography (PET) scan equipment, any form of magnetic resonance imagery (MM) equipment, ultrasound equipment, optical scanning equipment such as photo-plethysmographic equipment, or the like. At least a sensor 124 may include any electromagnetic sensor, including without limitation electroencephalographic sensors, magnetoencephalographic sensors, electrocardiographic sensors, electromyographic sensors, or the like. At least a sensor 124 may include a temperature sensor. At least a sensor 124 may include any sensor that may be included in a mobile device and/or wearable device, including without limitation a motion sensor such as an inertial measurement unit (IMU), one or more accelerometers, one or more gyroscopes, one or more magnetometers, or the like. At least a wearable and/or mobile device sensor may capture step, gait, and/or other mobility data, as well as data describing activity levels and/or physical fitness. At least a wearable and/or mobile device sensor may detect heart rate, or the like. At least a sensor 124 may detect bioimpedance of a subject including as it pertains to swelling, inflammation, hydrated state, and the like. At least a sensor 124 may detect any hematological parameter including blood oxygen level, pulse rate, heart rate, pulse rhythm, blood sugar, and/or blood pressure. At least a sensor 124 may be configured to detect internal and/or external biomarkers and/or readings. At least a sensor 124 may be a part of system 100 or may be a separate device in communication with system 100, such as in a wearable fitness device. Persons skilled in the art, upon review of this disclosure in its entirety, will be aware of the various types of sensors which may collect signals of the physiological data described above.

Continuing in reference to FIG. 1, retrieving a biometric profile may include generating machine-learning model training data from a plurality of signals. The plurality of signals received from at least a sensor 124 may be used as training data for a machine-learning process, algorithm, and/or generating a machine-learning model.

Continuing in reference to FIG. 1, computing device 104 may retrieve a biometric profile of the subject. A "biometric profile," as used in this disclosure, is a collection of determinations, qualitative and/or quantitative metrics, and data that relate to the physical status of the subject with respect to the subject's environment. In non-limiting illustrative examples, a biometric profile 112 may include a subject's unique environment parameters for optimum sleep. In such an example, the biometric profile 112 may include data corresponding to a particular temperature set by a thermostat, humidity controlled by a humidifier, sound level controlled by an ambient sound machine, a certain brightness set for the television, mobile phone, and light fixtures within a particular timeframe of attempting to sleep, a particular firmness of the sleeping surface such as a bed firmness setting (for instance, a SLEEP NUMBER mattress setting), a particular window of time for sleep, including a particular alarm and alarm settings for waking up on a particular device, among configuration of other environmental parameters conducive to sleeping for the subject. As used in this disclosure, an "environmental parameter," is a parameter relating to an aspect of a subject's environment. An environmental parameter may include physical parameters such as temperature, humidity, air quality, UV index, sound level, lighting level, device activation state, physical movement of items, among other environmental parameters. An environmental parameter may include non-physical parameters such as the "feeling" and/or "atmosphere" of a room, for instance from the color and amount of lighting, the type of sounds emitted from accessory devices 108, among other environmental parameters. Environmental parameters may be controlled and/or manipulated by accessory devices 108.

Continuing in reference to FIG. 1, retrieving a biometric profile 112 may include storing and/or retrieving biometric profile 112 from a database, such as a NoSQL database, relational database, or any other suitable data configuration and storage mechanism, as described in further detail below. A biometric profile 112 may be retrieved as a function of signals, as described in further detail below, for instance, computing device 104 may 'know' to store and/or retrieve biometric profile 112, or subsets of associated data, as a function of a classifier describing sensor 124 signal data.

Continuing in reference to FIG. 1, computing device 104 retrieving the biometric profile may include generating a representation of the biometric profile 112 via a graphical user interface. A "graphical user interface," as used in this disclosure, is any form of interface that allows a subject to interface with an electronic device through graphical icons, audio indicators, text-based interface, typed command labels, text navigation, and the like, wherein the interface is configured to provide information to the subject and accept input from the subject. Graphical user interface may accept subject input, wherein subject input may include communicating with system 100 to initiate accessory device 108 state changes, input biometric profile 112 data, and the like. Subject input via a graphical user interface may include deselecting elements in the pattern of accessory device states, as described in further detail below, changing activation thresholds, and/or modifying or altering any other determinations described herein. Subject input via a graphical user interface may include inputting satisfaction and/or dissatisfaction with accessory device 108 state change, optimum environmental parameters, and the like. Persons skill in the art, upon review of this disclosure in its entirety, will be aware of the various ways in which a graphical user interface may display the information herein and the various devices which may be a user device.

Continuing in reference to FIG. 1, computing device 104 is configured to identify a pattern of accessory device states for the plurality of accessory devices 108. A "pattern of accessory device states," as used in this disclosure, is a set of data pertaining to the state of at least one accessory device, including the identity or identities of the at least one accessory device, the at least one accessory device's activation state, including data corresponding to the current state of functioning, and the like. Computing device 104 may identify a 'pattern' of accessory device states, for instance and without limitation, wherein the computing device 104 identifies a pattern of which accessory devices 108 in an area, such as a house, may be currently powered "on", what their functioning state is, how long they have been "on", which accessory devices 108 are "off", how the accessory devices that are "on" and functioning have an effect on the environment they are positioned in, among other data. In non-limiting illustrative examples, computing device 104 may identify a "pattern" wherein the pattern indicated that ceiling fans are "on" and air conditioning is "on" but the thermostat is indicating that the temperature is not decreasing due to windows and doors being open, including the garage door. In such an example, computing device 104 may identify a pattern which may include that the totality of accessory devices 112 that are "on", are functioning to cool the house, but as indicated by the thermostat are not succeeding likely due to the windows and doors being ajar. Computing device 104 may determine a pattern by receiving the interaction data for the plurality of accessory device 108, as described above.

Continuing in reference to FIG. 1, identifying a pattern of accessory device states 116 may include determining, by the computing device 104, a coordinated state change for a group of accessory devices of the plurality of accessory devices 108 as a function of the interaction data and the biometric profile 112. A "coordinated state change," as used in this disclosure, is a coordinated change to the activation state and/or functioning of an accessory device 108 and/or group of accessory devices 108. Computing device 104 may receive interaction data, as described above, about a plurality of accessory devices 108 and retrieve a biometric profile 112 pertaining to a subject, and determine a coordinated state change 120 for the plurality of accessory devices 112, wherein the coordinated state change 120 is performed in response to changing the pattern of accessory device states 116 to a state that more closely resembles an optimum environment described by the biometric profile 112, as described in further detail below.

Continuing in reference to FIG. 1, computing device 104 may train a biometric machine-learning model with training data that includes a plurality of entries wherein each entry models sensor 124 signals to physiological data related to biometric state metrics data. As used in this disclosure, a "biometric state metric," is an element of data that describes a datum present in the biometric profile 112 of a subject. A biometric state metric may include an ideal room temperature for a subject with a particular age, medical history, and BMI. A biometric state metric may include an optimum lighting level in a room for a subject who routinely studies. Biometric machine-learning model may be any machine-learning algorithm that may be performed by a machine-learning module, as described in further detail below. Biometric machine-learning model 128 may be trained with training data that is a plurality of sensor 124 signals that relate to biometric state metrics, wherein a plurality of biometric state metrics determined by biometric machine-learning model 128 may be included in a biometric profile 112. In non-limiting illustrative examples, biometric machine-learning model 128 may be trained with senor 124 data over a period of months that illustrates a subject may increase their quality of sleep, indicated by REM cycles, light sleep patterns, deep sleep patterns, and movement in the night as detected by a plurality of sensors 124. In such an example, the biometric machine-learning model 128 may determine that the subject could potentially increase their REM cycle duration and deep sleep duration, while reducing their movement in the night, by sleeping during a particular range of thermostat function, noise level, humidity, air purification activity, going to sleep at a certain time, subjecting the subject to a particular light level prior to sleeping, among other environmental conditions and device function states. In further non-limiting illustrative examples, biometric machine-learning model 128 may also indicate relationships of sensor 124 data with temporal data that indicates optimal ranges of time for device functioning in addition to device parameters that may match biometric state metrics derived in the model.

Continuing in reference to FIG. 1, computing device 104 may determine, using the biometric machine-learning model, a biometric profile. The biometric profile may include biometric state metrics that describe an 'optimum environment'. As used in this disclosure, an "optimum environment," is a collection of environmental parameters that described an ideal environment, situation, and/or state for a subject. Biometric profile 112 may include a comprehensive profile of biometric state metrics that describe optimum environment conditions and cognate device configuration states for a subject in a variety of situations, for instance, while exercising, sleeping, eating, studying, working, pursuing leisure activities, and the like. For instance, and with continued reference to the examples above, biometric machine-learning model 128 may derive relationships, heuristics, patterns, and the like, from the training data that corresponds to environmental conditions and cognate device function states that result in optimum settings for the subject. "Optimum" may refer to a singular value, state, signifier, descriptor, and/or a range of values, states, signifiers, descriptors, or the like, that describes maximal attainment of a criterion. For instance, such a criterion could be maximal subject satisfaction, wherein what is 'optimum' is subject to input from subject. Optimum may include a range of values, settings, and the like, that can be determined by system 100, for instance by retrieving a biometric profile 112. Optimum may refer to a local maxima or local minima observed in training data, for instance and without limitation, "maximizing REM cycle sleep within an 8-hour period of time," wherein the REM cycle can only be maximized to a value≤8 hours, and the optimum device states may be local maxima identified in a machine-learning model associated with such a time point.

Continuing in reference to FIG. 1, identifying the pattern of accessory device states 116 for the group of accessory devices may include retrieving a biometric profile 112, wherein the biometric profile 112 contains environmental parameters associated with the plurality of accessory devices 180. A pattern of changes in the group of accessory devices may include a pattern that "should be applied" or may improve the functioning of the accessory devices. Computing device 104 may be configured to receive interaction data, as described above, which describes the activation state, functional relevance, and current state of operation of a plurality of accessory devices 108. Computing device 104 may be configured to determine a pattern of changes in at least a group of accessory devices of the plurality of accessory device 108. As used herein, a "group of accessory devices," may include at least one accessory device 108 that will undergo a state change, wherein at least one other device, of the remainder of devices, may undergo a state change that is "unchanged". Therefore, a pattern of state change of a "group of accessory devices" may refer to changing a single accessory device 108, but the pattern may include the fate of another accessory device 108. Computing device 104 may retrieve, or otherwise determine, a biometric profile 112 of a subject to retrieve environmental parameters that should be achieved by a group of accessory devices within the plurality of accessory devices 108 and identify a pattern of accessory devices states 116 that represent how the group of accessory devices should be changed to more closely resemble optimum environment parameters described by the biometric profile 112.

Continuing in reference to FIG. 1, computing device 104 may identify a pattern of changes in the group of accessory devices, wherein the pattern of changes is from a first state described in the interaction data to a second state related to the optimum environmental parameters. Computing device 104 may identify the identity of any accessory devices in the group of accessory devices to under a state change by, for instance, by comparing the interaction data (current state of accessory devices and the function of each accessory device) to the optimum environmental parameters for a second state (what the end state of accessory devices should be) and determine the identities of which accessory devices 108 should undergo a state change and to what state they will change to, resulting in an output that is a coordinated state change to the activation state and/or functioning of the group of accessory devices. Alternatively or additionally, computing device 104 may also determine the identities of the group of the accessory devices that will undergo the coordinated state change and the identities and states of the remainder of the plurality of accessory devices 108 that will not undergo a coordinated state change, and may output such a determination as a pattern of accessory device states 116. Computing device 104 may identify a pattern of changes in the group of accessory devices from the first state described in the interaction data, to a second state related to the optimum environmental parameters identified in a biometric profile 112, for instance as output by biometric machine-learning model 128.

Continuing in reference to FIG. 1, determining the biometric profile 112 may include using a biometric machine-learning process to generate a classifier, wherein the classifier contains a subset of data relating to biometric data. Biometric data may include accessory device 108 state changes, patterns of accessory device states, biometric-related maladies, and the like. A classifier may be a subset of data describing, for instance the identities of accessory devices 108 and the associated activation states that may represent optimum environmental parameters and device configurations for subjects with alike biometric profiles 112. A biometric machine-learning process 132 may include any machine-learning algorithm and/or process performed by using a machine-learning module, as described in further detail below. A "classifier," as used in this disclosure, is configured to output at least a datum that labels or otherwise identifies a set of data that are clustered together, as described in further detail below. A classifier 136 may represent a body of data that is a series of biometric data from a plurality of subjects associated with accessory devices 108, accessory device states, patterns, and the like. In non-limiting illustrative examples, a classifier 136 may relate to the identity and states of accessory devices 108, optimum environment parameters, and the like, that may be a packet of data used to search or otherwise identify determinations by system 100 described herein.

Continuing in reference to FIG. 1, retrieving the biometric profile 112 may include searching for at least a malady as a function of the plurality of data obtained from the at least a sensor 124. A "malady," as used in this disclosure, is a deviation from a healthy, or otherwise normal, physiology indicated as a function of the plurality of signals, as described above. A malady 140 may include a pattern of accessory device states, activation states, and/or accessory device use patterns derived from the plurality of signals. For instance and without limitation, a malady 140 may be that a subject prefers low light for studying, reading, electronic device usage, which may indicate strained vision, contribution to astigmatism, and other vision issues. In non-limiting illustrative examples, a malady may be that a subject wildly varies the temperature of their environment through use of the thermostat, space heaters, ceiling fans, and the like, which may be indicative of the subject having trouble regulating body temperature. Determining if a malady exists in a subject may include comparing biometric state thresholds, for instance a current biometric state to a threshold for healthy individuals. A "biometric state threshold," as used in this disclosure, is a value, metric, or element of data, that represents a threshold of an environmental parameter that may be controlled by an accessory device 108. For instance and without limitation, a biometric state threshold may include metrics that describe a pattern of accessory device 108 states that involve the activation states of a group of accessory devices to keep the air purity above a specific threshold during the spring and summer season to prevent a subject's allergic reactions. In non-limiting illustrative examples, the biometric state threshold may be a pollen count, pollen index, or the like, as determined by a UV sensor about a certain value, wherein that value is achieved from the activation state of and/or function of windows, doors, thermostat, air purifier, humidifier, and the like. In such an example, the biometric state threshold may represent environmental parameters relating to air purity that the accessory devices may control to maintain the area about a threshold value of allergens, above which the subject becomes uncomfortable.

Continuing in reference to FIG. 1, computing device 104 may search, using the data in the classifier 136, for at least a malady 140. For instance, a classifier 136 may contain data categorized for comparing a subject's biometric state threshold to thresholds for a subset of healthy individuals for determining the presence of a malady 140. In non-limiting illustrative examples, computing device 104 may then search, for instance from a database, for a malady 140 as a function of wearable device data contained in the classifier 136. In such an example, computing device 104 may likewise generate instead a new, distinct classifier 136 for the wearable device data as it relates to maladies 140. Classifier 136 for searching a malady 140 may be generated by a classification machine-learning process using any classification algorithm, as described in this disclosure. Training data for generating such a classifier 136 for may originate from accessory device 108 usage. Accessory device 108 usage may be classified as a function of biometric state thresholds in a particular subset of subjects. For instance and without limitation, accessory device 108 use data in a subject compared to alike subjects may be helpful in discerning if a subject is using an accessory device 108 to excess. Excessive accessory device 108 usage may be indicative of a malady 140. Training data may come from a plurality of signals collected by at least a sensor 124. Training data may come from a device configuration database, as described in further detail below, that stores accessory device 108 usage, patterns of usage, coordinated state changes, and the like. Classification machine-learning process may accept an input of such training data and generate a classifier that categories accessory device 108 usage as a function of a biometric state threshold to generate an output that is a classifier 136 that may be used to search for a malady 140.

Continuing in reference to FIG. 1, computing device 104 may use a classifier 136 to describe biometric state threshold, wherein the classifier 136 describes a subset of data for healthy, or otherwise normal, individuals. Alternatively or additionally, such a biometric state threshold may be generated using a machine-learning process, more generally, such as calculating a threshold from biometric profile data (for instance using regression/neural nets). Threshold may be generated using any machine-learning algorithm described herein. Training data for classifier 136 may originate from biometric profile 112 data retrieved by computing device 104 from the subject and/or a plurality of subjects. Training data may also include accessory device 108 identities, use patterns, and the like. Training data may be generated by subject as a function of using accessory devices 108. Training data may be generated from a plurality of signals generated by sensor 124, A machine-learning process, such as a biometric machine-learning process 132 may generate a classifier 136 using input data from a subject's biometric profile 112 and generate a classifier 136 as an output.

Continuing in reference to FIG. 1, in non-limiting illustrative examples, computing device 104 may use such a classifier 136 describing a subset of alike subject biometric profile 112 data and compare, for instance, optimum environment parameters, pattern of accessory device states 116, and the like, to determine that a subject prefers higher temperatures than others for their age, sex, and the like. For instance and without limitation, computing device 104 may identify from a biometric profile 112 a subject's preference for an elevated room temperature of 74 degrees Fahrenheit. In such an example, computing device 104 may compare subject's preference against a determined 'biometric state threshold', wherein the threshold may indicate an average value of 69 degrees Fahrenheit with a standard deviation of 2.0 degrees Fahrenheit. Upon comparison of the subject value against the biometric state threshold, computing device may query for at least a malady that may match a subject's preference for an unusually high room temperature. Computing device 104 may perform a query due to the subject's accessory device patterns indicating a preference for higher room temperature than a threshold for alike subjects, and locate that a subject may have anemia, thyroid issues, hypothalamic dysfunction, various nutritional deficiencies, and the like. Computing device 104 may query via an online web-browser using a textual-based search; additionally, computing device 104 may query a NoSQL database, a research repository, or the like.

Continuing in reference to FIG. 1, computing device 104 may determine, using the malady 140, a biometric-related comorbidity. A "comorbidity," as used in this disclosure, may include a chronic and/or acute disease, disorder, condition, injury, and/or symptom that may accompany or otherwise be related to a malady 140. A comorbidity may include an object-addressable malady, wherein the "object-addressable malady" is a disease, disorder, condition, injury, and/or symptom that may be addressed by the activation of and/or function of an accessory device 108. Essentially, system 100 may identify if a subject's pattern of accessory device states 116 indicates an abnormality when compared to subsets of data from alike subjects. For instance and without limitation, determining if a subject's deviation in environment parameters from alike subjects may represent a malady, comorbidity, condition, or the like, that may be ameliorated, addressed, or otherwise reduced by configuring accessory devices 108 in a particular manner.

Continuing in reference to FIG. 1, computing device 104 is configured to determine an automation rule for the group of accessory devices as a function of the pattern of accessory device states. As used in this disclosure, an "automation rule," is a specification of an action to be taken by one or more accessories and an activation threshold under which the action is to be taken. An "activation threshold," as used in this disclosure is a triggering condition for executing an action of the automation rule. The automation rule 144 action may be any action that may be performed by an accessory device 108. The rule may specify which accessory device 108 (or plurality of accessory devices 108) is to act. The activation threshold may be any condition that is detectable by computing device 104 or by any accessory device 108. For example and without limitation, an automation rule 144 may specify that a porch light (an accessory device 108) is to be activated if an outside ambient light sensor (which may be a separate accessory device 108 and/or a component of the porch light accessory device 108) detects a light level below a threshold, or at a specific time each night (such as 6:30 pm), or at a time determined based on information available to computing device 104 (such as sunset, wherein computing device 104 may determine the time of sunset by accessing weather data via the Internet, or the like). In further non-limiting examples, an action may include turning on a heating (or cooling) system to adjust the temperature of a house to a target temperature or changing the target temperature for the heating (or cooling) system. In such an example, the activation threshold for a temperature change may be, for example, a specific time (for instance, shortly before the time the subject normally arrives at home) or a specific event (for instance, when the subject actually arrives home, wishes to retire for the night, plans to begin a home workout routine, etc.).

Continuing in reference to FIG. 1, automation rules 144 may be established in any manner desired. For example and without limitation, a subject may establish an automation rule 144 by direct input, such as via a graphical user interface by entering explicit instructions specifying an activation threshold and the action to be taken in response to that condition. In non-limiting illustrative embodiments, computing device 104 or other components of system 100 may 'learn' the subject's behavior and/or patterns of accessory device 108 usage and define suggested automation rules 144, for instance, as described above. In non-limiting examples, computing device 104 or other components of system 100 may present a suggested automation rule 144 to the subject, and the subject may accept or decline the suggestion. Computing device 104 and/or accessory device 108 may detect a pattern and suggest an automation rule 144 to implement these actions automatically or when an activation threshold is met, such as when the subject arrives home. If the subject accepts the suggestion, the new automation rule 144 may be added to an automation rules 144 data store, such as a NoSQL database, relational database, online repository, cloud-based repository, or the like. Other techniques for establishing automation rules 144 may also be used. Likewise, subject input for modifying and/or altering automation rule 144 and/or activation thresholds may be stored and/or retrieved from database as part of a subject's biometric profile 112. Such subject-indicated inputs may be classified by computing device 104 using a classification machine-learning process, as described herein.

Continuing in reference to FIG. 1, determining an automation rule 144 may include receiving the coordinated state change 120 for a group of accessory devices of the plurality of accessory devices and determining an activation threshold for changing the states of the plurality of accessory device. Computing device 104 may determine activation threshold by retrieving biometric profile 112. Computing device 104 may determine activation threshold by retrieving previous activation thresholds from a database, as described in further detail below. Computing device may use an automation machine-learning process to determine activation thresholds for changing the states of the group of accessory devices. Automation machine-learning process 148 may be any machine-learning algorithm and/or machine-learning process performed by a machine-learning module, as described in further detail below. In non-limiting illustrative examples, automation machine-learning process 148 may accept an input that is a pattern of accessory device states 116 and a coordinated state change 120 intended to achieve a particular optimum environmental parameters, and generate an output that is a plurality of activation thresholds for executing an activation rule 144. In such an example, automation machine-learning process 148 may determine activation thresholds corresponding to when to turn on and/or off a heating or cooling system, for instance, by controlling a thermostat, space heater, ceiling fan, or the like, to achieve a specific room temperature for a subject prior to reaching their home.

Continuing in reference to FIG. 1, automation machine-learning process 148 may rank the activation thresholds. In non-limiting illustrative examples, automation machine-learning process 148 may determine activation thresholds for accessory devices used in preparing a meal and hosting a house party, wherein the activation thresholds relate to the use of a variety of household appliances that need to be activated with temporal specificity, wherein a ranking may be necessary. In such an example, automation machine-learning process 148 may rank, using a ranking function, a plurality of determined activation thresholds, wherein ranking is based on a chronological ordering of activation thresholds in an automation rule 144. Thus, automation machine-learning process 148 may generate a plurality of chronologically ranked activation thresholds. In further non-limiting illustrative examples, ranked activation thresholds may include controlling kitchen appliances in sequence to prepare Hors d'oeuvres, followed closely by controlling lighting, stereo sound, entertainment system, garage door system, and the like, in a specific ordering as guests arrive. In such an example, the activation threshold may be different and may occur at different times. Essentially, automation machine-learning process 148 may determine the plurality of activation thresholds for the plurality of accessory devices 108 and manipulate the plurality of accessory devices 108 throughout the day as a function of the automation rule 144 it generated.

Continuing in reference to FIG. 1, computing device 104 may generate, as a function of the ranking, the automation rule 144, wherein the automation rule 144 may include a hierarchy of instructions for activating at least an accessory device 108. The hierarchy of instructions may include ranked activation thresholds, wherein the activation thresholds contain a chronological ordering for a group of accessory devices within a plurality of accessory devices 108 to change their activation state. The hierarchy of instructions may include simple, binary instructions such as "on/off". The hierarchy of instructions may include more specific qualitative and/or quantitative instructions such as "high/medium/low/etc." settings or a numerical value such as a temperature, volume, or the like. The hierarchy of instructions may include a ranking wherein a first accessory device 108 must adopt a specific activation state prior to triggering the activation threshold of a second accessory device 108.

Continuing in reference to FIG. 1, determining an automation rule 144 may include transmitting the automation rule 144 as a function of the activation threshold. The automation rule 144 may include an activation signal for changing the activation state of accessory device 108. An "activation signal," as used in this disclosure, is a signal directed to an accessory device 108 to change its activation state. Computing device 104 may transmit an activation signal as a function of the automation rule 144, for instance as determined by the automation machine-learning process 148. Computing device 104 may transmit to an accessory device 108 an automation rule 144, wherein the accessory device 108 may store and/or retrieve the automation rule 144. Accessory devices 108 may interact with computing device 104 and/or amongst one another for transmission of an activation signal, as described in further detail below. Computing device 104 may determine to transmit an activation signal as a function of the automation rule 144, or as a function of the interaction data from a plurality of accessory devices 108. Computing device 104 may determine to transmit an activation signal as a function of how the automation rule 144 adopts optimum environment parameters described in a biometric profile 116. In such an instance, certain optimum environment parameters may have been achieved, wherein at least an instruction in the automation rule 144 may have been "achieved" or be otherwise made moot, wherein computing device 104 would determine to not transmit an activation signal to an accessory device 108.

Continuing in reference to FIG. 1, at least an accessory device 108 may be configured to accept the automation rule 144, as a function of the biometric profile 112, from the computing device 104. Computing device 104 may transmit an automation rule 144 to at least an accessory device 108 related to biometric state data in the biometric profile 112. For instance and without limitation, computing device 104 may transmit an automation rule 144 to achieve optimum environmental parameters described in the biometric profile 112, wherein the parameters may relate to light, sound, temperature, air quality, humidity, and the like, that at least an accessory device 108 available to computing device 104 may send an automation rule 144 to change the state of the accessory device 108.

Continuing in reference to FIG. 1, changing the state of the group of accessory devices may include generating, using the computing device, at least an accessory device token and transmitting, using the computing device, the accessory device token to the accessory device 108. An "accessory device token," as used in this disclosure, is an access token containing security credentials computing device 104 and accessory device 108 use to identify one another and communicate. Computing device 104 may establish communication with at least an accessory device 108 by generating an accessory device token 152. Computing device 104 may generate a unique accessory device token 152 for each device and/or may establish an accessory device token 152 for all accessory devices 108 communicating with computing device 104. Computing device 104 may generate and transmit an accessory device token 152 to authenticate with the plurality of accessory devices 108 and/or for the plurality of accessory devices 108 to communicate with a database that stores automation rules 144. Accessory device token 152 may include an identifier associated with a logon session, wherein the identifier contains credentials to initiate communication between computing device 104 and accessory device 108. Persons skilled in the art, upon reviewing the entirety of this disclosure, will be aware of various ways in access tokens may be generated and shared among devices.

Continuing in reference to FIG. 1, an accessory device token 152 may include communication exchange such as a 'telecommunication handshake' that includes an automated process of communications between two or more devices, such as computing device 104 and accessory device 108. A telecommunication handshake includes the exchange of information establishing protocols of communication at the start of communication before full communication commences. A telecommunication handshake may include exchanging signals to establish a communication link as well as to agree as to which protocols to implement. A telecommunication handshake may include negotiating parameters to be utilized between subject accessory device 108 and computing device 104, including information transfer rate, coding alphabet, parity, interrupt procedure, and/or any other protocol or hardware features. A telecommunication handshake may include but is not limited to a transmission control protocol (TCP), simple mail transfer protocol (SMTP), transport layer security (TLS), Wi-Fi protected access (WPA), and the like.

Continuing in reference to FIG. 1, transmitting the automation rule 144 to the accessory device 108 may include sending a radio wave signature, wherein the radio wave signature is unique. A "radio wave signature," as used in this disclosure, is a radio frequency communication signal designed for communication between components in system 100. Radio wave signature 156 may be transmitted by a network interface, implemented on a hardware component and/or software component. As used in this disclosure, "uniqueness" of the radio wave signature 156 identifies that the nature of the radio wave signature 156 is transmitted solely as a means to activate accessory devices 108 intended for use with system 100. The uniqueness of the radio wave signature 156 may include that it does not interfere with activating extraneous accessory devices 108, and such that extraneous signals cannot mimic radio wave signature 156 originating from system 100. For instance and without limitation, radio wave signature 156 is unique in that it may not generically activate all accessory device 104 at the same time; furthermore, the radio wave signature 156 may not be mimicked by a secondary source, such as a secondary Wi-Fi generated signal, radio frequency signal, or the like. Radio wave signature 156 may include statistically unique signature such as a globally unique ID (GUID) or universally unique ID (UUID) or that system 100 may maintain a database of IDs which are unique within a location, across system 100.

Continuing in reference to FIG. 1, radio wave signature 156 may include radio frequencies and electromagnetic frequencies between approximately 20 kHz and approximately 300 GHz intended for communication between electronic devices, for instance as commonly used between network interfaces and local wireless communication. In exemplary embodiments, transmitting radio wave signature 156 may include radio frequency (RF) transceiver components for accessing wireless voice and/or data networks (for instance, using cellular telephone technology, data network technology such as 3G, 4G/LTE, Wi-Fi (IEEE 802.11 family standards), or other mobile communication technologies, or any combination thereof), components for short-range wireless communication (for instance, using Bluetooth and/or Bluetooth LE standards, NFC, etc.), and/or other components. Network interface may provide wired network connectivity (such as Ethernet) in addition to and/or instead of a wireless interface. Network interface may be implemented using a combination of hardware (for instance, driver circuits, antennas, modulators/demodulators, encoders/decoders, and other analog and/or digital signal processing circuits) and software components. Network interface may support multiple communication channels concurrently, using the same transport or different transports, as necessary.

Continuing in reference to FIG. 1, computing device 104 may transmit radio wave signature 156 to control devices controlled via a touch pad, touch screen, scroll wheel, click wheel, dial, button, switch, keypad, microphone, or the like, as well as accessory devices 108 containing control elements such as a video screen, indicator lights, speakers, headphone jacks, or the like, together with supporting electronics (for instance, digital-to-analog or analog-to-digital converters, signal processors, or the like). A subject may operate accessory devices 108 via user interfaces to invoke the functionality of computing device 104 automation rule 144 and may view and/or hear output from computing device 104 automation rule 144 via transmission to devices compatible with a user interface.

Continuing in reference to FIG. 1, computing device 104 may control the function of the accessory device 108 as a function of the automation rule 144. Transmitting the automation rule 144 to the accessory device 108 may include controlling the function of the group of accessory devices as a function of the biometric profile 112 of the subject. Automation rule 144 may be transmitted to at least an accessory device 108 to configure accessory device 108 in accordance with environmental parameters described in biometric profile 112, as described above.

Figure 2:
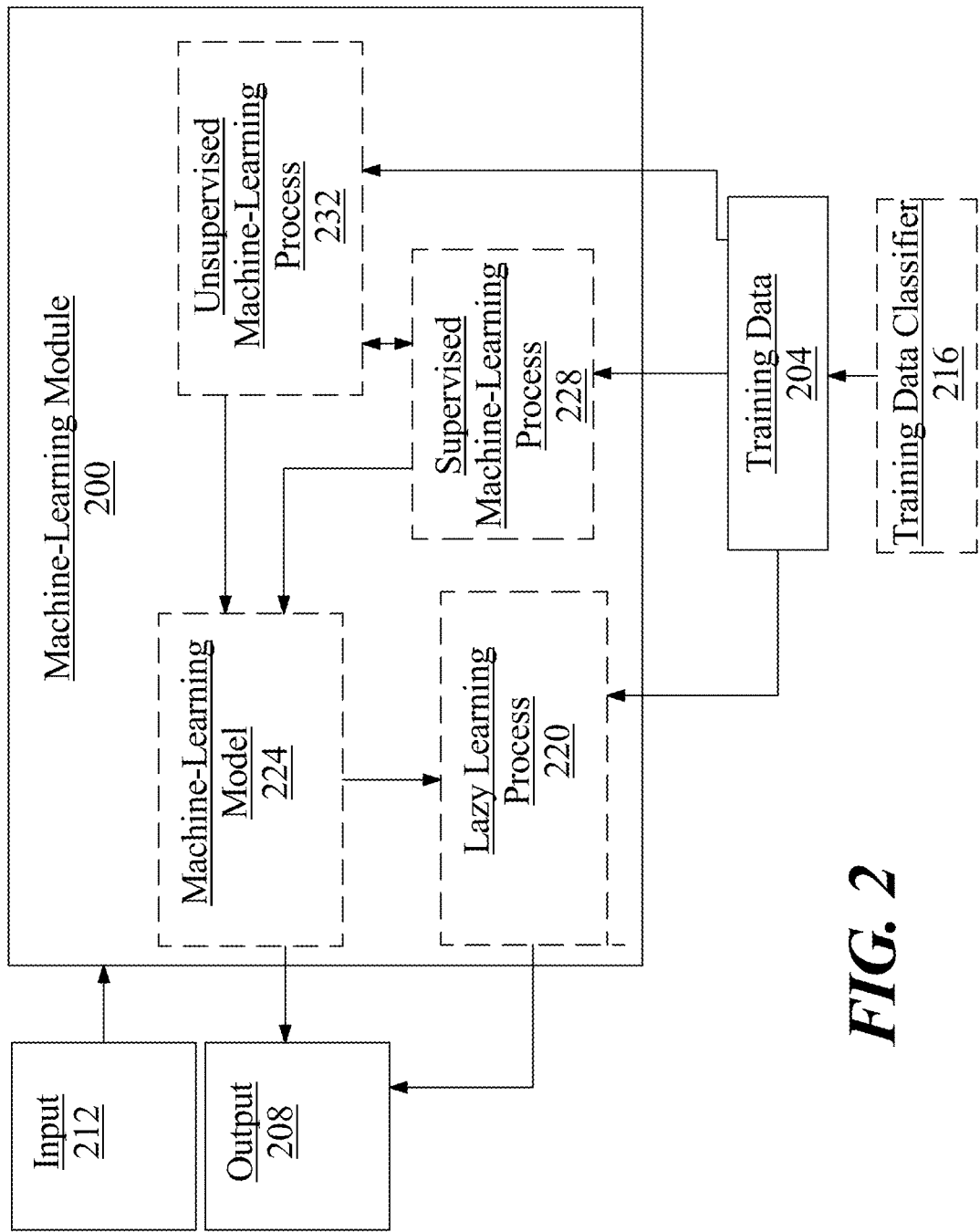
FIG. 2 is a block diagram illustrating a non-limiting exemplary embodiment of a machine-learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a subject and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail herein. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail herein; such models may include without limitation a training data classifier 216. Training data classifier 216 may include a "classifier," which as used in this disclosure is a machine-learning model as defined herein, such as a mathematical model, neural net, or program generated by a machine learning algorithm known as a "classification algorithm," as described in further detail herein, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to elements that characterizes a sub-population, such as a subset of accessory device 108 states, patterns, maladies, comorbidities, biometric profiles 112, and/or other analyzed items and/or phenomena for which a subset of training data may be selected.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail herein.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include a plurality of sensor 124 signals and remote data as described above as inputs, optimum environment parameters, and a ranking function representing a desired form of relationship to be detected between inputs and outputs; ranking function may, for instance, seek to maximize the probability that a given input and/or combination of elements inputs is associated with a given output to minimize the probability that a given input is not associated with a given output. Ranking function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 2, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data 204.

Figure 3:
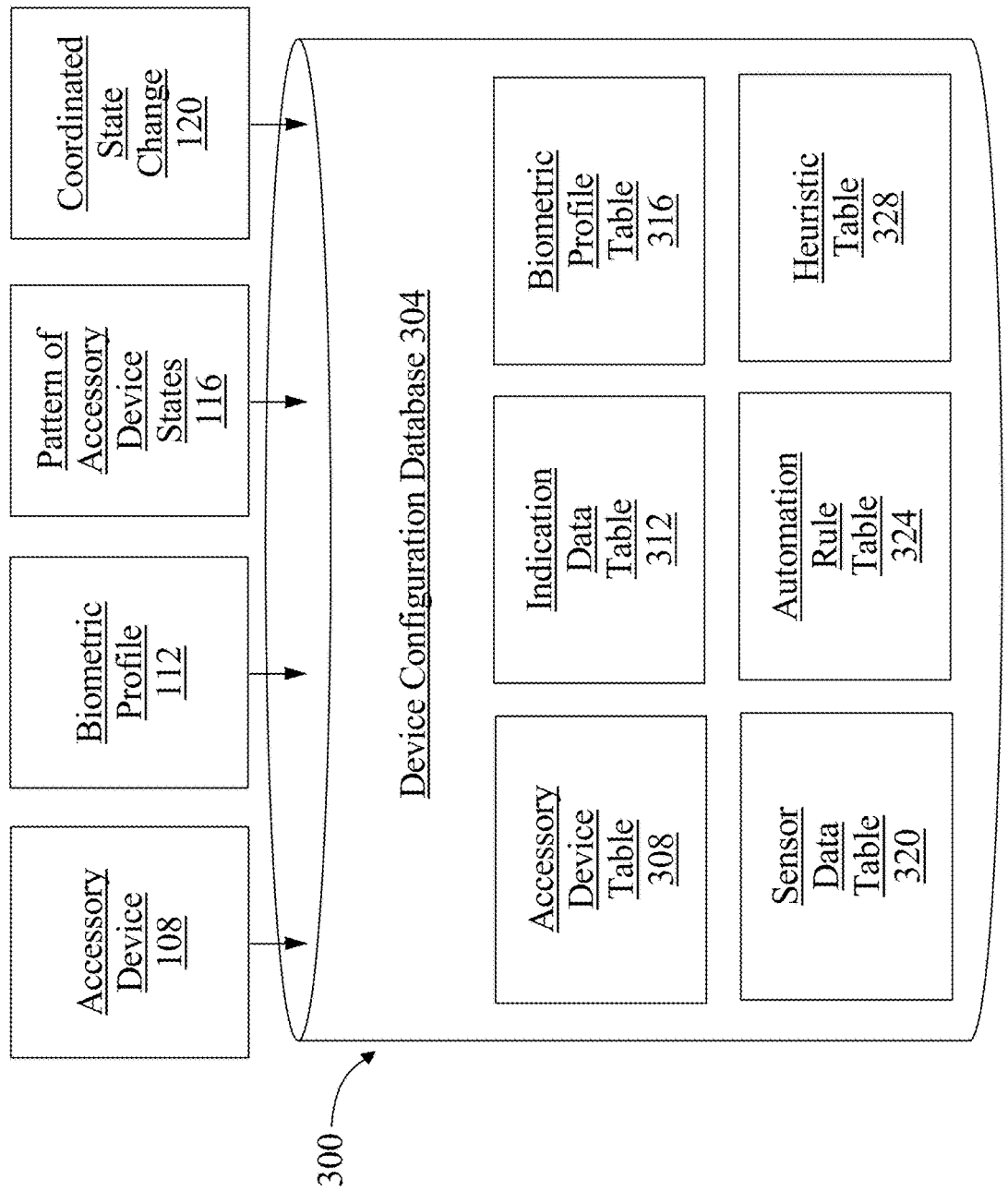
FIG. 3 is a block diagram illustrating a non-limiting exemplary embodiment of a device configuration database.

Referring now to FIG. 3, a non-limiting exemplary embodiment 300 of a device configuration database 304 is illustrated. Device configuration database 304 may be implemented, without limitation, as a relational database, a key-value retrieval database such as a NOSQL database, or any other format or structure for use as a database that a person skilled in the art would recognize as suitable upon review of the entirety of this disclosure. Device configuration database 304 may alternatively or additionally be implemented using a distributed data storage protocol and/or data structure, such as a distributed hash table and the like. Device configuration database 304 may include a plurality of data entries and/or records, as described above. Data entries in an device configuration database 304 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. Computing device 104 may retrieve any determinations, as described herein, from the device configuration database 304, such as a pattern of accessory device states as a function of the coordinated state change.

Further referring to FIG. 3, device configuration database 304 may include, without limitation, an accessory device table 308, indication data table 312, biometric profile table 316, signals table 320, automation rule table 324, and/or heuristic table 328. Determinations by a machine-learning process, machine-learning model, ranking function, mapping algorithm and/or objection function, may also be stored and/or retrieved from the device configuration database 304, for instance in non-limiting examples a classifier describing a plurality of biological extraction 108 as it relates to a plurality of objects, wherein a classifier is an identifier that denotes a subset of data that contains a heuristic and/or relationship, as may be useful to system 100 described herein. As a non-limiting example, device configuration database 304 may organize data according to one or more instruction tables. One or more device configuration database 304 tables may be linked to one another by, for instance in a non-limiting example, common column values. For instance, a common column between two tables of device configuration database 304 may include an identifier of a submission, such as a form entry, textual submission, accessory device tokens, local access addresses, metrics, and the like, for instance as defined herein; as a result, a search by a computing device 104 may be able to retrieve all rows from any table pertaining to a given submission or set thereof. Other columns may include any other category usable for organization or subdivision of data, including types of data, names and/or identifiers of individuals submitting the data, times of submission, and the like; persons skilled in the art, upon reviewing the entirety of this disclosure, will be aware of various ways in which data from one or more tables may be linked and/or related to data in one or more other tables.

Still referring to FIG. 3, in a non-limiting embodiment, one or more tables of an device configuration database 304 may include, as a non-limiting example, an accessory device table 308, which may include categorized identifying data, as described above, including accessory devices 108, accessory device tokens, and the like. One or more tables may include indication data table 312, which may include data regarding activation state, functionality of devices, and the like, for instance and without limitation, that system 100 may use to retrieve and/or store. One or more tables may include biometric profile table 316, which may include a biometric state metrics, including classifiers, data, and the like, for instance and without limitation, that system 100 may use to retrieve and/or store optimum environment parameter associated with subject. One or more tables may include signals table 320, which may include classifiers, physiological data, and the like, as described above for instance and without limitation, that system 100 may use to retrieve and/or store biometric state parameters, optimum environment parameters, and the like, associated with subject. One of more tables may include an automation rule table 324, which may include outputs, determinations, variables, and the like, organized into subsets of data for coordinated state changes 120 associated with pattern of accessory device states 116, activation thresholds, rankings, and the like, associated with executing automation rules 144. One or more tables may include, without limitation, a heuristic table 328, which may organize rankings, scores, models, outcomes, functions, numerical values, vectors, matrices, and the like, that represent determinations, optimizations, iterations, variables, and the like, include one or more inputs describing potential mathematical relationships, as described herein.

Figure 4:
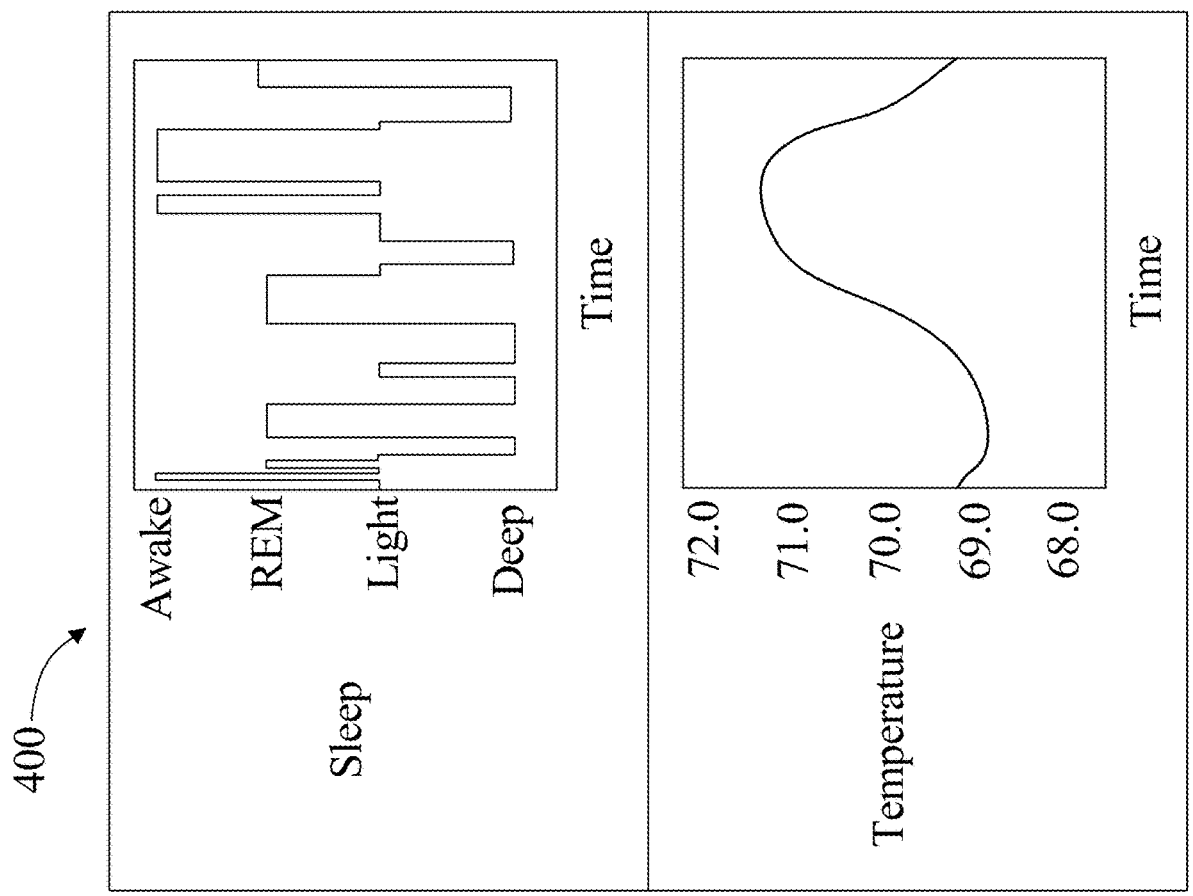
FIG. 4 is a diagrammatic representation illustrating a non-limiting exemplary embodiment of a biometric profile.

Referring now to FIG. 4, a non-limiting exemplary embodiment 400 of biometric profile 112 biometric state metric for determining an optimum environmental parameter is illustrated. Sensor 124 signal may correspond to tracking subject sleep states, as denoted in FIG. 4 top panel. Sleep may be tracked with a plurality of sensors 124, for instance, motion sensors present on a subject's limps, such as on the wrist and/or ankle, a sphygmomanometer sensor for blood pressure, a microphone sensor 124 for tracking snoring, at least a sensor 124 for tracking respiration and respiratory cycle, among other sensors 124, which may be used for analyzing sleep quality. Sleep quality may be tracked as a function of time via the sensor 124 signal data, wherein sleep quality may include determining how long a subject is in REM sleep, deep sleep, or the like. Biometric profile 112 may include at least a biometric state metric for determining an optimum environmental parameter, for instance the temperature conducive to improved sleep quality, as depicted in FIG. 4 bottom panel. In such an example, the room temperature as a function of time can be plotted alongside sleep states, where patterns may emerge. A machine-learning model may be used to determine the precision and recall in pattern recognition of how temperature relates to sleep quality over time. A thermometer, or similar thermal sensor 124 may track room temperature data alongside sleep data, wherein as the temperature increases above 70 degrees Fahrenheit, the subject awakens, as tracked by movement, audio pickup, blood pressure, respiratory cycle, and the like, that may be tracked by sensor 124.

Continuing in reference to FIG. 4, biometric profile 112 may include a plurality of biometric state metrics for optimum environment parameters, for instance and without limitation with respect to sleep parameters, accessory devices 108 may be utilized to control room temperature; relative humidity; air quality of pollutants, pollen, dander, and other allergens; sound level and use of ambient sound control; lighting and electronic device usage, especially prior to sleep; alarm settings for awakening, among other parameters. Biometric profile 112 and the associated plurality of biometric state metrics for optimum environment parameters may be utilized to configure device environment to control accessory devices 108 to configure the subject's environment. Biometric profile 112 and the associated plurality of biometric state metrics for optimum environment parameters may be used to identify a malady 140. For instance and without limitation, patterns of accessory device states 116, especially when compared to subgroups of alike subjects using classifier 136, may include identifying a malady 140 that predicts or otherwise identifies potential health issues in subject.

Figure 5:
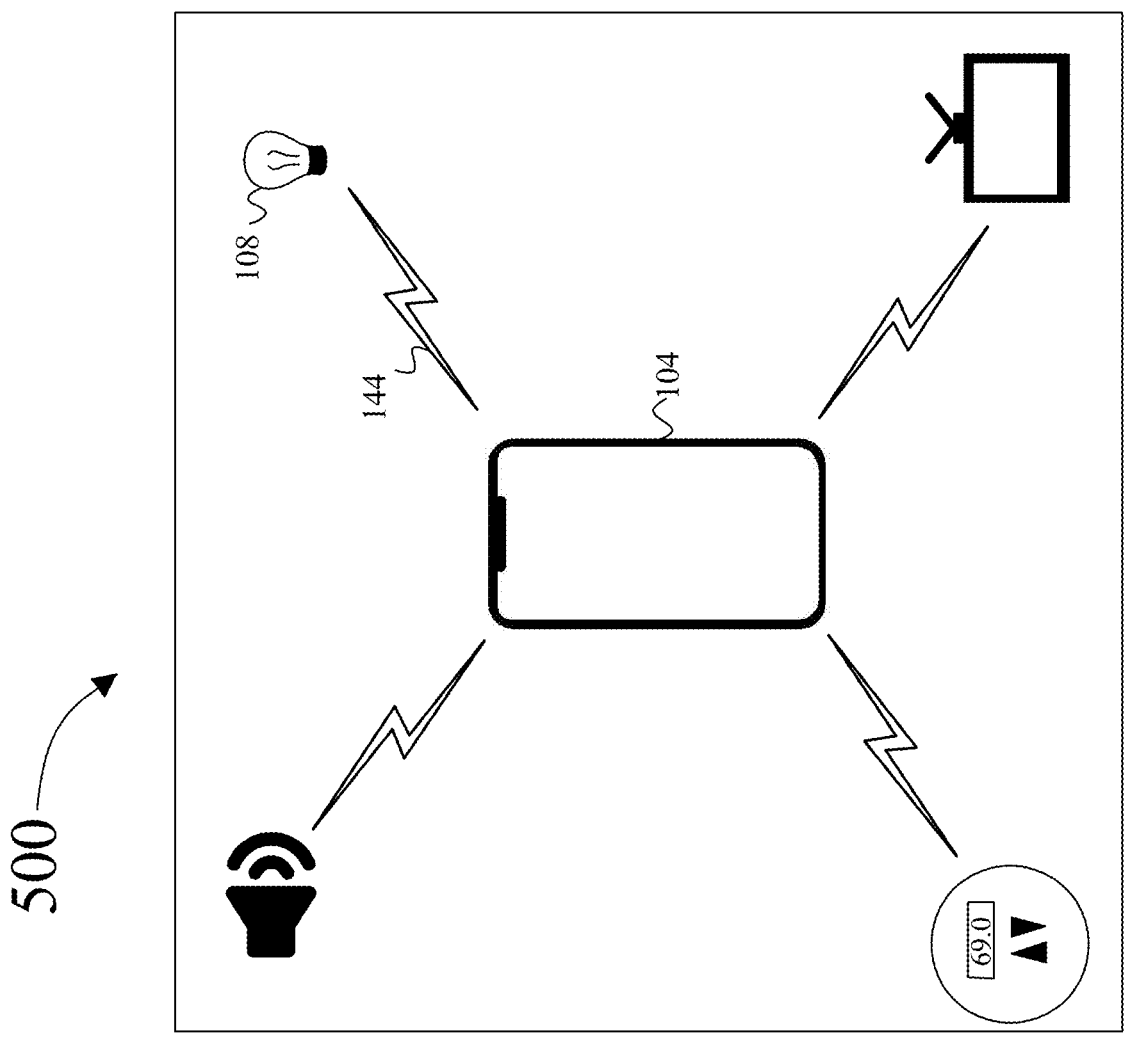
FIG. 5 is a diagrammatic representation illustrating a non-limiting exemplary embodiment of an automation rule transmitted by a computing device.

Referring now to FIG. 5, a non-limiting exemplary embodiment 500 of an automation rule 144 being transmitted by computing device 104 is illustrated. Computing device 104 may include a user device, or any other device that is capable of performing the functions described herein by computing device 104, including a "smartphone", mobile phone, laptop, computer tablet, internet-of-things (IOT) device, and the like. Computing device 104 may transmit an automation rule 144 to a plurality of accessory devices 108. Accessory devices 108 may receive transmitted automation rule 144, as described above, using Bluetooth, Wi-Fi internet connectivity, and the like. A plurality of environmental parameters, as described above, may be controlled and/or affected by a plurality of accessory devices 108 including for instance and without limitation thermostat for heating and cooling, speakers, surround sound entertainment systems, televisions, radios, lighting, television and multimedia devices, garage door systems, remote start vehicles, house alarm systems, and the like. In non-limiting illustrative examples, an automation rule 144 may be a "vacation protocol in winter" wherein the automation rule 144 has specific instructions for 'arming house alarm system', 'closing garage door', 'keep room temperature above 60 degrees Fahrenheit to avoid pipes freezing but never exceed 65 degrees Fahrenheit to avoid unnecessary energy use', 'power off all appliances', among other potential instructions in automation rule 144. Such an automation rule 144 may include a triggering condition that relates to when a subject chooses to initiate the automation rule 144 via a graphical user interface, for instance from the subject's vehicle on the way to the airport.

Figure 6:
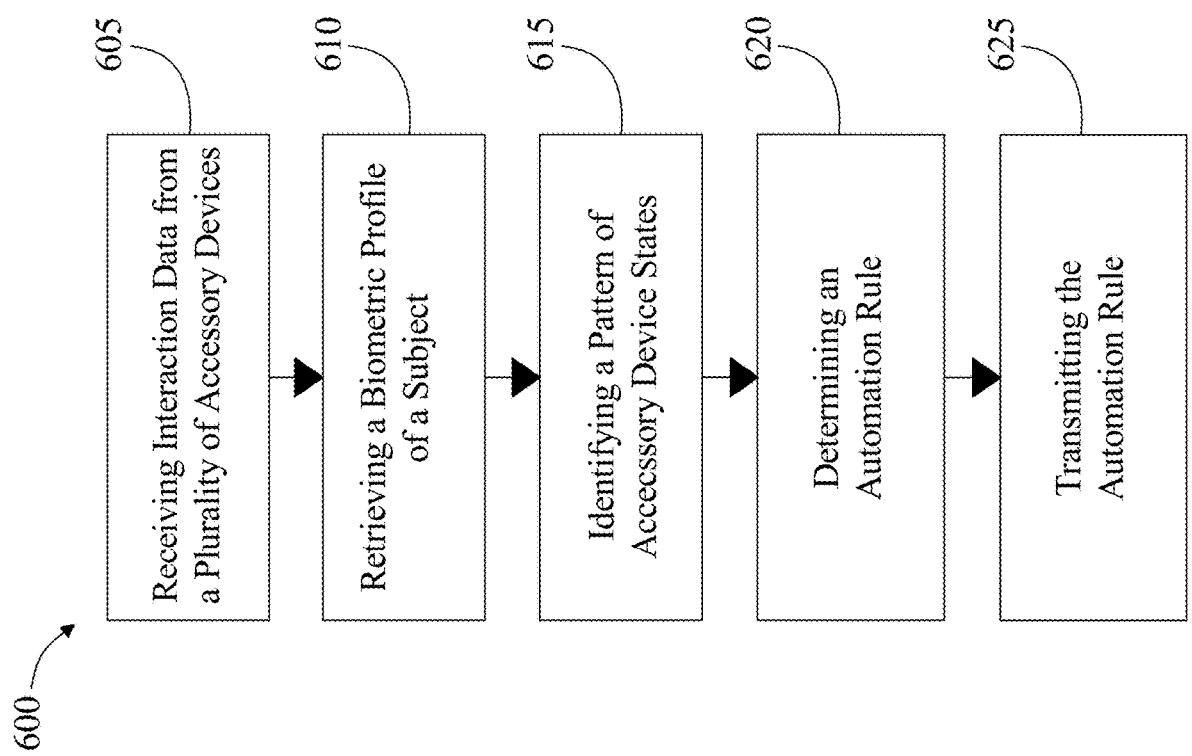
FIG. 6 is a block diagram of an exemplary embodiment of a workflow of a method for a configurable device environment.

Referring now to FIG. 6, a non-limiting exemplary embodiment of a method 600 for configurable device environment. At step 605, computing device 104 is configured for receiving interaction data from a plurality of accessory devices 108, wherein the interaction data corresponds to an interaction with a subject. Interaction data from a plurality of accessory devices may include data relating to the activation state and function of the plurality of accessory devices 108 as it relates to the presence of the subject; this may be implemented, without limitation, as described above in reference to FIGS. 1-5.

Still referring to FIG. 6, at step 610, computing device 104 is configured for retrieving a biometric profile of the subject as a function of receiving a plurality of signals from at least a sensor. Retrieving the biometric profile 112 may include receiving subject input via a graphical user interface. Retrieving the biometric profile 112 may include training a biometric machine-learning model 128 with training data that includes a plurality of entries wherein each entry models sensor 124 signals to physiological data related to biometric state metrics data and determining, using the biometric machine-learning model 128, the biometric profile 112; this may be implemented, without limitation, as described above in reference to FIGS. 1-5.

Continuing in reference to FIG. 6, at step 615, computing device 104 is configured for identifying a pattern of accessory device states 116 for the plurality of accessory devices 108, wherein identifying a pattern includes determining, by the computing device 104, a coordinated state change 120 for a group of accessory devices of the plurality of accessory devices 108 that should be applied as a function of the interaction data and the biometric profile 112 and identifying the pattern of accessory device states 116 as a function of the coordinated state change 120. Identifying the pattern of accessory device states 116 that should be applied to the group of accessory devices may include retrieving a biometric profile 112, wherein the biometric profile 112 contains environmental parameters associated with the plurality of accessory devices 108 and identifying a pattern of changes in the group of accessory devices, wherein the pattern of changes is from a first state described in the interaction data to a second state related to the optimum environmental parameters. Retrieving the biometric profile 112 may include searching for at least a malady 140 as a function of the plurality of data obtained from the at least a sensor 124; this may be implemented, without limitation, as described above in reference to FIGS. 1-5.

Continuing in reference to FIG. 6, at step 615, computing device 104 identifying a pattern of accessory device states 116 for the plurality of accessory devices 108 as a function of the subject's biometric profile 112 may include receiving a plurality of signals from a plurality of sensors 124, wherein each sensor 124 of the plurality of sensors 124 is configured to detect within the proximity of the subject, training a biometric machine-learning model 128 with training data that includes a plurality of entries wherein each entry models sensor 124 signals to physiological data related to biometric state metrics data, determining, using the biometric machine-learning model 128, a biometric profile 112, wherein the biometric profile 112 may include biometric state metrics that describe an optimum environment, and identifying a pattern of changes in the group of accessory devices, wherein the pattern of changes is from a first state described in the interaction data to a second state related to the optimum environmental parameters. Determining the biometric profile 112 may include using a biometric machine-learning process 132 to generate a classifier 136, wherein the classifier 136 contains a subset of data relating to biometric data, searching, using the data in the classifier 136, for at least a malady 140, wherein a malady 140 is indicated in at least a biometric state metric in comparison to a biometric state threshold in healthy subjects, and determining, using the malady 140, a biometric-related comorbidity; this may be implemented, without limitation, as described above in reference to FIGS. 1-5.

Continuing in reference to FIG. 6, at step 620, computing device 104 is configured for determining an automation rule 144 for the group of accessory devices as a function of the pattern of accessory device state. Determining an automation rule 144 may include receiving the coordinated state change for a group of accessory devices of the plurality of accessory devices 108, determining, using an automation machine-learning process 148, an activation threshold for changing the states of the plurality of accessory devices 108, and transmitting the automation rule 144 as a function of the activation threshold. At least an accessory device 108 is configured to accept the automation rule 144, as a function of the biometric profile 112, from the computing device 104. Changing the state of the group of accessory devices may include generating, using the computing device 104, at least an accessory device token 152, transmitting, using the computing device 104, the accessory device token 152 to the accessory device 108; this may be implemented, without limitation, as described above in reference to FIGS. 1-5.

Continuing in reference to FIG. 6, at step 625, computing device 104 is configured for transmitting, to the group of accessory devices, the automation rule 144. Transmitting the automation rule 144 to the accessory device 108 may include sending a radio wave signature 156, wherein the radio wave signature 156 is unique and controlling the function of the accessory device 108 as a function of the automation rule 144; this may be implemented, without limitation, as described above in reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
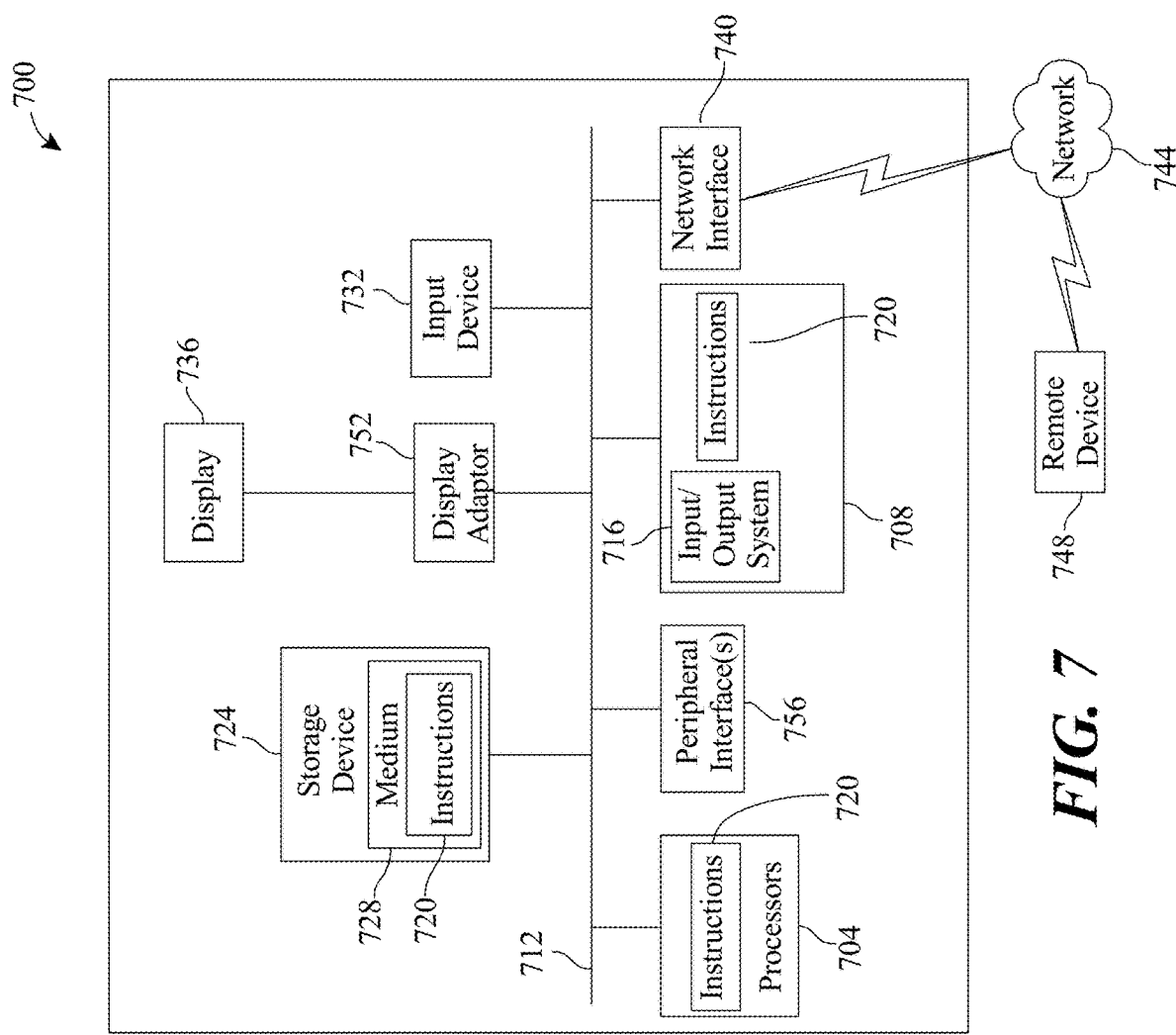
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for a configurable device environment, the system comprising a computing device, wherein the computing device is configured to:
    receive remote data corresponding to a subject, wherein the remote data further comprises biological extraction data;
    retrieve a biometric profile of the subject as a function of a plurality of signals, wherein the plurality of signals comprises simulated data comprising a three dimensional portrayal of the subject, wherein the three-dimensional portrayal of the subject further compares a look of the subject with optimal nourishment to a display of the subject without the optimal nourishment;

identify a pattern of accessory device states for a plurality of accessory devices,
  wherein identifying the pattern of accessory device states further comprises:
    determining, by the computing device, a coordinated state change for a group of accessory devices of the plurality of accessory devices as a function of the interaction data and the biometric profile; and
    identifying the pattern of accessory device states as a function of the coordinated state change; and
  control the function of the plurality of accessory devices as a function of the pattern of accessory device states.

2. The system of claim 1, wherein receiving the remote data comprises receiving interaction data from a plurality of accessory devices.

3. The system of claim 2, wherein the interaction data corresponds to an interaction with a subject.

4. The system of claim 1, wherein receiving the remote data comprises receiving a plurality of signals from at least a sensor proximate to the subject, wherein a signal of the plurality of signals comprises skin data.

5. The system of claim 4, wherein a signal of the plurality of signals comprises simulated data generated at an online platform.

6. The system of claim 1, wherein controlling the function of the plurality of accessory devices comprises determining an automation rule for the group of accessory devices as a function of the pattern of accessory device states.

7. The system of claim 6, wherein controlling the function of the plurality of accessory devices further comprises transmitting, to the group of accessory devices, the automation rule.

8. The system of claim 1, wherein retrieving the biometric profile further comprises:
  training a biometric machine-learning model as a function of training data that includes a plurality of entries wherein each entry models sensor signals to physiological data related to biometric state metrics data; and
  determining, as a function of the biometric machine-learning model and the plurality of signals, the biometric profile.

9. The system of claim 1, wherein:
  the biometric profile includes environmental parameters associated with the plurality of accessory devices; and
  identifying the pattern of accessory device states that should be applied to the group of accessory devices further comprises identifying a pattern of changes in the group of accessory devices, wherein the pattern of changes is from a first state described in the interaction data to a second state related to the optimum environmental parameters.

10. The system of claim 1, wherein retrieving the biometric profile further comprises identifying a malady as a function of the plurality of signals, wherein the plurality of signals comprises genomic data.

11. A method for a configurable device environment, the method comprising:
  receiving, by at least a computing device, remote data corresponding to a subject, wherein the remote data further comprises biological extraction data;
  retrieving, by the at least computing device, a biometric profile of the subject as a function of the plurality of signals, wherein the plurality of signals comprises simulated data comprising a three dimensional portrayal of the subject, wherein the three-dimensional portrayal of the subject further compares a look of the subject with optimal nourishment to a display of the subject without the optimal nourishment;
  identifying, by the at least computing device, a pattern of accessory device states for a plurality of accessory devices, wherein identifying the pattern of accessory device states further comprises:
    determining, by the computing device, a coordinated state change for a group of accessory devices of the plurality of accessory devices as a function of the interaction data and the biometric profile; and
    identifying the pattern of accessory device states as a function of the coordinated state change; and
  controlling, by the at least computing device, the function of the plurality of accessory devices as a function of the pattern of accessory device states.

12. The method of claim 11, wherein receiving the remote data comprises receiving interaction data from a plurality of accessory devices.

13. The method of claim 12, wherein the interaction data corresponds to an interaction with a subject.

14. The method of claim 11, wherein receiving the remote data comprises receiving a plurality of signals from at least a sensor proximate to the subject, wherein a signal of the plurality of signals comprises skin data.

15. The method of claim 14, wherein a signal of the plurality of signals comprises simulated data generated at an online platform.

16. The method of claim 11, wherein controlling the function of the plurality of accessory devices comprises determining an automation rule for the group of accessory devices as a function of the pattern of accessory device states.

17. The method of claim 16, wherein controlling the function of the plurality of accessory devices further comprises transmitting, to the group of accessory devices, the automation rule.

18. The method of claim 11, wherein retrieving the biometric profile further comprises:
  training a biometric machine-learning model as a function of training data that includes a plurality of entries wherein each entry models sensor signals to physiological data related to biometric state metrics data; and
  determining, as a function of the biometric machine-learning model and the plurality of signals, the biometric profile.

19. The method of claim 11, wherein:
  the biometric profile includes environmental parameters associated with the plurality of accessory devices; and
  identifying the pattern of accessory device states that should be applied to the group of accessory devices further comprises identifying a pattern of changes in the group of accessory devices, wherein the pattern of changes is from a first state described in the interaction data to a second state related to the optimum environmental parameters.

20. The method of claim 11, wherein retrieving the biometric profile further comprises identifying a malady as a function of the plurality of signals, wherein the plurality of signals comprises genomic data.

* * * * *